Figure 1:
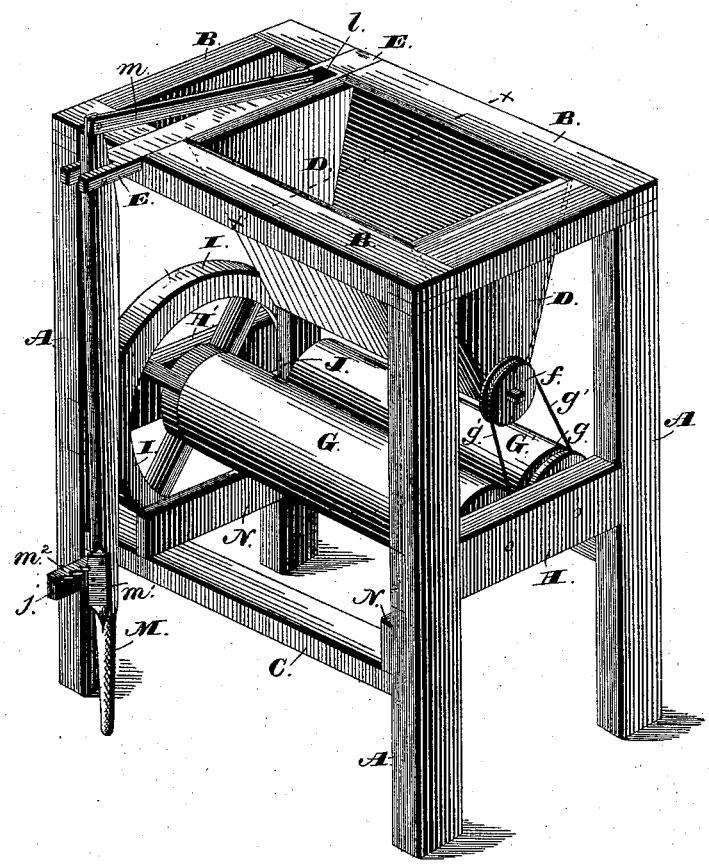

(No Model.) 2 Sheets—Sheet 1.

J. P. KEETON.
MACHINE FOR CRUSHING COTTON SEED.

No. 268,803. Patented Dec. 12, 1882.

WITNESSES
Jas. E. Hutchinson.
Geo. W. Seymour.

INVENTOR
James P. Keeton
By H. A. Seymour
Attorney (No Model.) 2 Sheets—Sheet 2.
J. P. KEETON.
MACHINE FOR CRUSHING COTTON SEED.
No. 268,803. Patented Dec. 12, 1882.
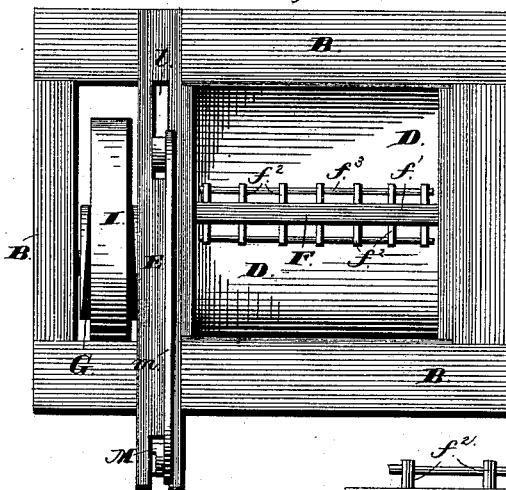
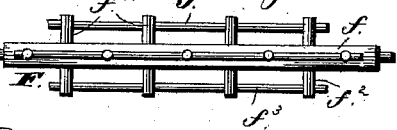
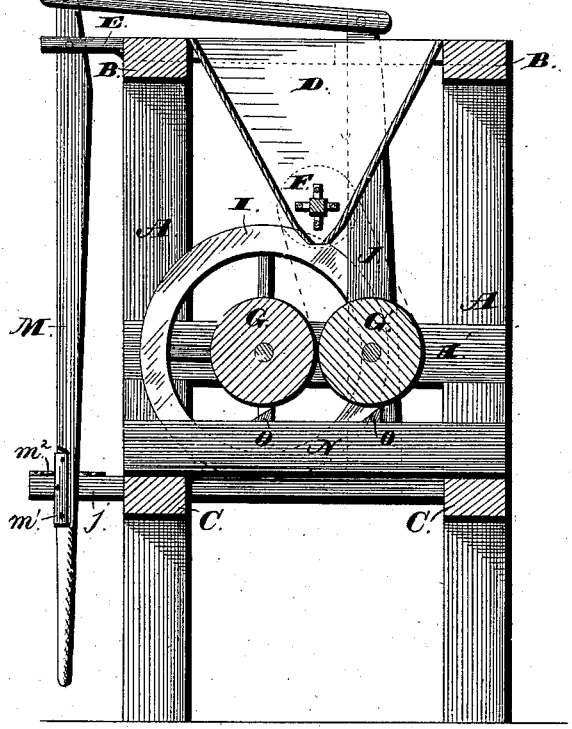
WITNESSES
Jas. E. Hutchinson
Geo. W. Seymour
INVENTOR
James P. Keeton
By H. A. Seymour
Attorney

UNITED STATES PATENT OFFICE.

JAMES P. KEETON, OF MORTON, MISSISSIPPI.

MACHINE FOR CRUSHING COTTON-SEED.

SPECIFICATION forming part of Letters Patent No. 268,803, dated December 12, 1882.

Application filed August 9, 1882. (No model.)

*To all whom it may concern:*

Be it known that I, JAMES P. KEETON, of Morton, in the county of Scott and State of Mississippi, have invented certain new and useful Improvements in Machines for Crushing Cotton-Seed; and I do hereby declare the following to be a full, clear, and exact description of the invention, such as will enable others skilled in the art to which it pertains to make and use the same.

My invention relates to machines for crushing cotton-seed, the object being to provide a machine of this character which will be of simple and economical construction and adapted to thoroughly crush the seed to destroy its vitality and render it available as a fertilizer.

The invention consists in the improved construction and combinations of parts hereinafter fully described, and pointed out in the claim.

In the drawings, Figure 1 is a perspective view of a machine constructed in accordance with my invention. Fig. 2 is a plan view of the same. Fig. 3 is a vertical section on the line $x$ $x$ of Fig. 1, and Fig. 4 is a detached view of the feed-roller.

The frame of the machine consists of standards A, upper cross-bars, B, and lower cross-bars, C.

D represents the hopper of the machine, of the usual form and supported between one of the end cross-bars B and a bar, E, secured to the side bars B parallel with and near one of the end cross-bars B. A revolving feeder, F, is journaled within the hopper near its lower end, the outer journal of the feeder projecting beyond the hopper and provided with a grooved wheel, $f$, to receive a belt, as will be further explained. The feeder F consists of a shaft, $f'$, provided with radial pins $f^2$, whose ends are perforated to receive wires $f^3$. The feeder thus constructed is light and inexpensive, and operates to thoroughly feed the seed to the rolls below the hopper.

G G' represent the crushing-rolls, both of which are journaled at one end of the machine in bearings of a cross-bar, H. The opposite end of the roller G is journaled in an opposite bar, H', of the frame, and is provided adjacent to said bar H' with a driving-wheel, I, adapted to receive a belt and be operated from any suitable source of power. The roll G is thus held stationary in its bearings. The roll G' is slightly shorter than the roll G, and is provided at one end with an annular groove, $g$, to receive a belt, $g'$, which also passes around the wheel $f$ of the revolving feeder. The opposite end of the roll is journaled in a bearing of a vertical support, J, pivoted at its lower end to a cross-bar, $j$, connecting the lower bars, C, of the frame, while its upper end projects through an elongated slot, $l$, of a horizontal bar, E, secured to the upper sides of the cross-bars B of the frame, and is pivotally secured between links $m$ $m$, secured to the upper end of an operating-lever, M, which latter is fulcrumed on the outer end of the bar E, and is provided at its lower end with a plate or catch, $m'$, adapted to engage a notched plate, $m^2$, secured to the projecting end of the bar $j$. By means of the bar M the roll G' may be adjusted to or from the stationary roll G.

N N represent horizontal slats or supports, secured upon the lower cross-bars, C. Upon these supports are secured scrapers O O, arranged one under each of the rolls G G', and adapted to scrape from the rolls any particles which may adhere thereto.

The operation of my improvement will be readily understood. The seed is poured into the hopper, and the revolving feeder discharges it between the rolls, which thoroughly crush the same. The crushed seed will drop below the rolls into any receptacle provided for it, or onto the floor or ground, as the case may be. The stationary roll G is driven, as above stated, by any suitable power, and communicates motion to the roll G' by frictional contact therewith, which latter in turn, by means of the belt $g'$, revolves the feeder.

The device as thus constructed is of small cost in manufacture and reliable and durable in use.

Having fully described my invention, what I claim as new, and desire to secure by Letters Patent, is—

In a machine for crushing cotton-seed, the combination, with a crushing-roll journaled in stationary bearings and having a drivingpulley connected therewith, of an adjustable crushing-roll journaled at one end in a stationary bearing, a support pivoted at one end and having one end of the adjustable roll journaled therein, and an operating-lever connected with the free end of said pivoted arm for imparting any desired adjustment to said roll, substantially as set forth.

In testimony whereof I have signed this specification in the presence of two subscribing witnesses.

JAMES POLK KEETON.

Witnesses:
N. T. LILES,
W. T. HALSELL.